(12) United States Patent
Tison et al.

(10) Patent No.: US 7,412,986 B2
(45) Date of Patent: Aug. 19, 2008

(54) METHOD AND SYSTEM FOR FLOW MEASUREMENT AND VALIDATION OF A MASS FLOW CONTROLLER

(75) Inventors: Stuart A. Tison, McKinney, TX (US); Sandeep Sukumaran, McKinney, TX (US); James Barker, Lewisville, TX (US)

(73) Assignee: Celerity, Inc., Austin, TX (US)

( * ) Notice: Subject to any disclaimer, the term of this patent is extended or adjusted under 35 U.S.C. 154(b) by 384 days.

(21) Appl. No.: 10/887,591

(22) Filed: Jul. 9, 2004

(65) Prior Publication Data

US 2006/0005882 A1    Jan. 12, 2006

(51) Int. Cl.
*G01F 1/34* (2006.01)

(52) U.S. Cl. .................. 137/12; 137/487.5; 137/486; 137/2; 73/1.16; 73/861.43

(58) Field of Classification Search .............. 137/2, 137/9, 12, 486, 487.5; 73/1.16, 1.34, 1.35, 73/31.04, 861.42, 861.43; 702/45, 100, 50, 702/51
See application file for complete search history.

(56) References Cited

U.S. PATENT DOCUMENTS

| | | | | |
|---|---|---|---|---|
| 3,222,918 A | * | 12/1965 | Kuntz et al. ............... | 73/53.01 |
| 3,363,461 A | * | 1/1968 | Minkoff ..................... | 73/861 |
| 3,911,256 A | * | 10/1975 | Jones .......................... | 702/47 |
| 3,958,443 A | * | 5/1976 | Berrettini .................... | 73/1.34 |
| 4,146,051 A | | 3/1979 | Sparks | |
| 4,195,516 A | * | 4/1980 | Fredericks ............... | 73/861.01 |
| 4,285,245 A | | 8/1981 | Kennedy | |
| 4,364,413 A | * | 12/1982 | Bersin et al. ............. | 137/624.2 |
| 4,651,788 A | * | 3/1987 | Grosskreuz et al. ........... | 141/83 |
| 4,867,375 A | | 9/1989 | Ueki et al. | |
| 5,201,581 A | | 4/1993 | Vander Heyden et al. | |
| 5,299,447 A | | 4/1994 | Caron | |
| 5,445,035 A | * | 8/1995 | Delajoud ................. | 73/861.52 |
| 5,684,245 A | | 11/1997 | Hinkle | |
| 5,865,205 A | * | 2/1999 | Wilmer ......................... | 137/2 |
| 5,900,534 A | | 5/1999 | Miller et al. | |
| 5,925,829 A | | 7/1999 | Laragione et al. | |

(Continued)

OTHER PUBLICATIONS

MKS Instruments, Tru-Flo Mass Flow Verifier Model GBR3A, Bulletin Tru-FLo May 2001.*
MKS Instruments, Gas Box Rate-of Rise in Situ Flow Verifier, Bulletin GBROR—Aug. 1999.*

*Primary Examiner*—John Rivell
*Assistant Examiner*—Craig Price
(74) *Attorney, Agent, or Firm*—Lowrie, Lando & Anastasi, LLP

(57) ABSTRACT

Systems and methods for flow verification and validation of mass flow controllers are disclosed. A mass flow controller may be commanded to a specified flow and flow measurement commenced. Gas is accumulated in a first volume and while measurements are taken within this volume. Gas may then flow into a second volume while measurements are taken. The various measurements taken during the two intervals may then be used to calculate the flow rate. The flow rate, in turn, may be used to determine the accuracy of the mass flow controller relative to a setpoint. Additionally, these systems and methods may utilize only one volume to perform flow verification by flowing gas into this volume, taking measurements, and calculating the flow rate based only upon this set of measurements.

23 Claims, 8 Drawing Sheets

U.S. PATENT DOCUMENTS

| | | |
|---|---|---|
| 6,119,710 A | 9/2000 | Brown |
| 6,216,726 B1 | 4/2001 | Brown et al. |
| 6,363,958 B1 * | 4/2002 | Ollivier ................... 137/2 |
| 6,539,968 B1 | 4/2003 | White et al. |
| 6,568,416 B2 * | 5/2003 | Tucker et al. ............. 137/14 |
| 6,712,084 B2 | 3/2004 | Shajii et al. |
| 6,955,072 B2 * | 10/2005 | Zarkar et al. ............. 73/1.36 |
| 7,137,400 B2 * | 11/2006 | Bevers et al. ............. 137/1 |
| 7,150,201 B2 | 12/2006 | Tison et al. |
| 7,174,263 B2 | 2/2007 | Shajii et al. |
| 2002/0173923 A1 * | 11/2002 | Schutzbach et al. ....... 702/45 |
| 2003/0236638 A1 * | 12/2003 | Shajii et al. .............. 702/45 |
| 2006/0011237 A1 | 1/2006 | Tison et al. |
| 2006/0217900 A1 | 9/2006 | Shajii et al. |

* cited by examiner

METHOD AND SYSTEM FOR FLOW MEASUREMENT AND VALIDATION OF A MASS FLOW CONTROLLER

RELATED APPLICATIONS AND PATENTS

This application is related to U.S. Pat. No. 6,343,617, entitled "System and Method of Operation of a Digital Mass Flow Controller," by Tinsley et al., issued on Feb. 5, 2002; U.S. Pat. No. 6,640,822, entitled "System and Method of Operation of a Digital Mass Flow Controller," by Tinsley et al., issued on Nov. 4, 2003; U.S. Pat. No. 6,681,787, entitled "System and Method of Operation of a Digital Mass Flow Controller," by Tinsley et al., issued on Jan. 27, 2004; U.S. Pat. No. 6,389,364, entitled "System and Method for a Digital Mass Flow Controller," by Vyers, issued on May 14, 2002; U.S. Pat. No. 6,714,878, entitled "System and Method for a Digital Mass Flow Controller," by Vyers, issued on Mar. 30, 2004; U.S. Pat. No. 6,445,980, entitled "System and Method for a Variable Gain Proportional-Integral (PI) Controller," by Vyers, issued on Sep. 3, 2002; U.S. Pat. No. 6,449,571, entitled "System and Method for Sensor Response Linearization," by Tariq et al., issued on Sep. 10, 2002; U.S. Pat. No. 6,575,027, entitled "Mass Flow Sensor Interface Circuit," by Larsen et al., issued on Jun. 10, 2003; U.S. Pat. No. 5,901,741, entitled "Flow Controller, Parts of Flow Controller, and Related Method," by Mudd et al., issued on May 11, 1999; U.S. Pat. No. 5,850,850, entitled "Flow Controller, Parts of Flow Controller, and Related Method," by Mudd, issued on Dec. 22, 1998; U.S. Pat. No. 5,765,283, entitled "Method of Making a Flow Controller," by Mudd, issued on Jun. 16, 1998. All patents and applications cited within this paragraph are fully incorporated herein by reference.

TECHNICAL FIELD OF THE INVENTION

The invention relates in general to methods and systems for validating the performance of a mass flow controller, and more particularly, to validating the performance of a mass flow controller using a rate of rise flow standard.

BACKGROUND OF THE INVENTION

Modern manufacturing processes sometimes require precise stoichiometric ratios of chemical elements during particular manufacturing phases. To achieve these precise ratios, different process gases may be delivered into a process chamber during certain manufacturing phases. A gas panel may be used to deliver these process gasses to a process tool with one or more chambers or reactors. A gas panel is an enclosure containing one or more gas pallets dedicated to deliver process gases to the process tool. The gas panel is in turn composed of a group of gas pallets, which is itself composed of a group of gas sticks.

A gas stick assembly may contain several discrete components such as an inlet fitting, manual isolation valve, binary controlled pneumatic isolation valves, gas filters, pressure regulators, pressure transducers, inline pressure displays, mass flow controllers and an outlet fitting. Each of these components is serially coupled to a common flow path or dedicated channel for one particular process gas. A manifold and a valve matrix channel the outlet of each gas stick to the process chamber.

To achieve a certain stoichiometric ratio, a process tool controller asserts setpoints to the mass flow controllers, and sequences the valve matrices, associated with certain gas sticks. The indicated flow value is output by the mass flow controller of each gas stick and monitored by the process tool controller.

A mass flow controller (MFC) is constructed by interfacing a flow sensor and proportioning control valve to a control system. The flow sensor is coupled to the control system by an analog to digital converter. The control valve is driven by a current controlled solenoid valve drive circuit. A mass flow measurement system is located upstream of the control valve. The control system monitors the setpoint input and flow sensor output while refreshing the control valve input and indicated flow output. Closed loop control algorithms executed by the embedded control system operate to regulate the mass flow of process gas sourced at the inlet fitting through the proportioning control valve and outlet fitting such that the real-time difference or error between the setpoint input and indicated flow output approaches zero or null as fast as possible with minimal overshoot and as small a control time as possible. As over 500 species of gases may be used in the manufacturing of certain electronic components, the operation of each of the respective mass flow controllers is critical. Typically, these mass flow controllers are validated using the process chamber itself. FIG. 1 depicts one such prior art system where process chamber 130 is used as a flow verification tool. To verify mass flow controller 120, a setpoint signal is input to mass flow controller 120 which in turn begins flowing gas to process chamber 130. As the volume of process chamber 130 is known, a primary flow measurement technique known as rate-of-rise may be utilized to measure the flow into that volume. This method utilizes the conservation of mass principle and the equation of state of the gas to derive a relationship between the pressure in a fixed volume and the flow (mass flow) into that volume. The equation is given as, $$\dot{m} = \frac{\left[\frac{\Delta P \cdot V}{RT}\right]}{\Delta t} \qquad \text{eq. (1)}$$

where $\Delta P$ is the change in pressure over the interval $\Delta t$, R is the universal gas constant, T is the absolute temperature of the gas, and V is the volume of the measurement chamber. Eq. 1 utilizes the ideal gas equation as the equation of state; similar equations can be derived for other equations of state.

Unfortunately, the volume of typical process chamber 130, which may be on the order of 20 to 60 liters makes measurements of small flow extraordinarily time consuming. Additionally, process chamber 130 may exhibit large temperature gradients throughout its volume, distorting both the measurement and calculation of the mass flow into process chamber 130.

FIG. 2 shows the amount of time required to achieve a given change in pressure for some typical flow rates using typical process chamber 130 of between 20 and 60 liters. Due to many other constraints, a minimum pressure of 0.1 Torr may be required to initiate the measurement, and 0.3 Torr minimum accumulated pressure required to make the measurement. As a result, to perform a single flow point validation of a 2 sccm flow can require up to 5 minutes and verification of a mass flow controller may then take as long as 30 minutes. This lengthy validation cycle decreases the tool availability and adds cost to the user.

In addition to the slowness of the measurement, the accuracy of the measurement is typically no better than +/−5% of the reading. The primary contributing errors are: errors in temperature, errors in chamber volume, and unaccounted for gases (adsorption or desorption).

Other methods of validating mass flow controller 120 may utilize a secondary volume in parallel to process chamber 130 to measure flow. However, these methods do not allow the measuring of transient (non steady-state) performance of mass flow controller 120, and the many steps required to determine the volume upstream of mass flow controller 120 make this technique difficult to integrate into existing systems and may exacerbate already long time requirements for validation.

Thus, there is a need for systems and methods for validating a mass flow controller which can quickly measure dynamic performance and validate a mass flow controller, while simultaneously improving the accuracy of the validation process by reducing measurement uncertainties.

SUMMARY OF THE INVENTION

Systems and methods for flow verification and validation of mass flow controllers are disclosed. These systems and methods are capable of measuring the dynamic performance of a mass flow controller and may perform flow verification and measurement in one step. Two volumes may be used in conjunction to accurately determine a total volume during a measurement sequence, minimize false flow conditions and reduce sensitivity to pressure transients. A mass flow controller may be coupled to a measurement system. The mass flow controller may be commanded to a specified flow and the system may begin flow measurement. Gas is accumulated in a volume between the mass flow controller and the measurement system and the pressure measured within this volume. Gas may then flow into a known volume and the pressure measured. The various measurements taken during the two intervals may then be used to calculate the volume between the mass flow controller and the measurement system and the flow rate. The flow rate, in turn, may be used to determine the accuracy of the mass flow controller relative to a setpoint.

In one embodiment, first data pertaining to a first volume is collected during a first interval is collected, second data pertaining to a second volume is collected during a second interval, the first volume is determined and the flow calculated.

In another embodiment, the first volume comprises calculating the first volume based on the first data and the second data.

In yet another embodiment, the first data includes the change in pressure over the first interval and the second data includes the change in pressure over the second interval.

In still another embodiment, the first volume is determined by receiving an input.

In other embodiments a system for measuring a flow through a mass flow controller is coupled to the mass flow controller downstream of the mass flow controller, the system includes a chamber, a first valve coupled to the chamber upstream of the chamber, a second valve coupled to the chamber downstream of the chamber and a pressure sensor coupled to the chamber upstream of the first valve.

In still other embodiments, the system is operable to collect first data pertaining to a first volume during a first interval and collect second data pertaining to a second volume during a second interval;

In some embodiments, the second data is collected before the first data is collected.

In some embodiments, the first data is collected before the second data is collected.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DESCRIPTION OF PREFERRED EMBODIMENTS

Figure 1:
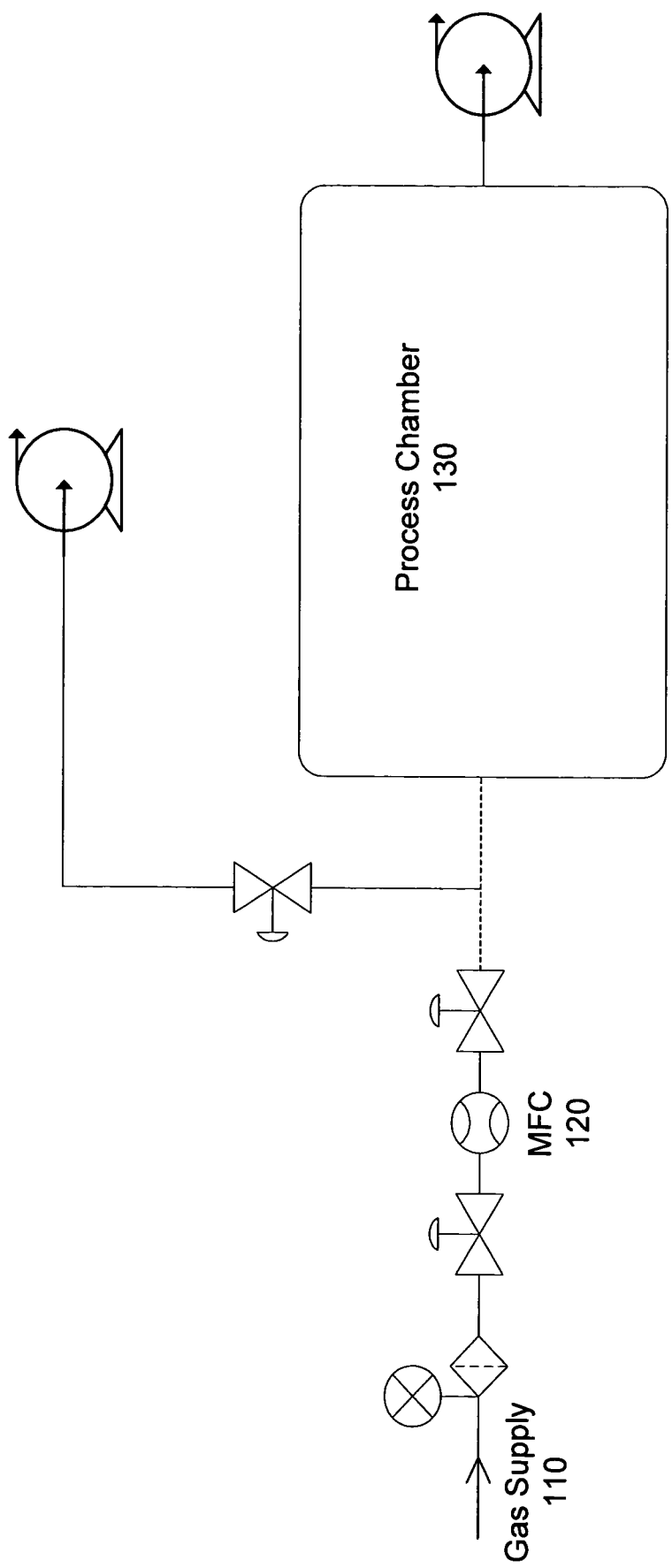
FIG. 1 includes an illustration of a conventional prior art system for validating a mass flow controller using a process chamber.
Figure 2:
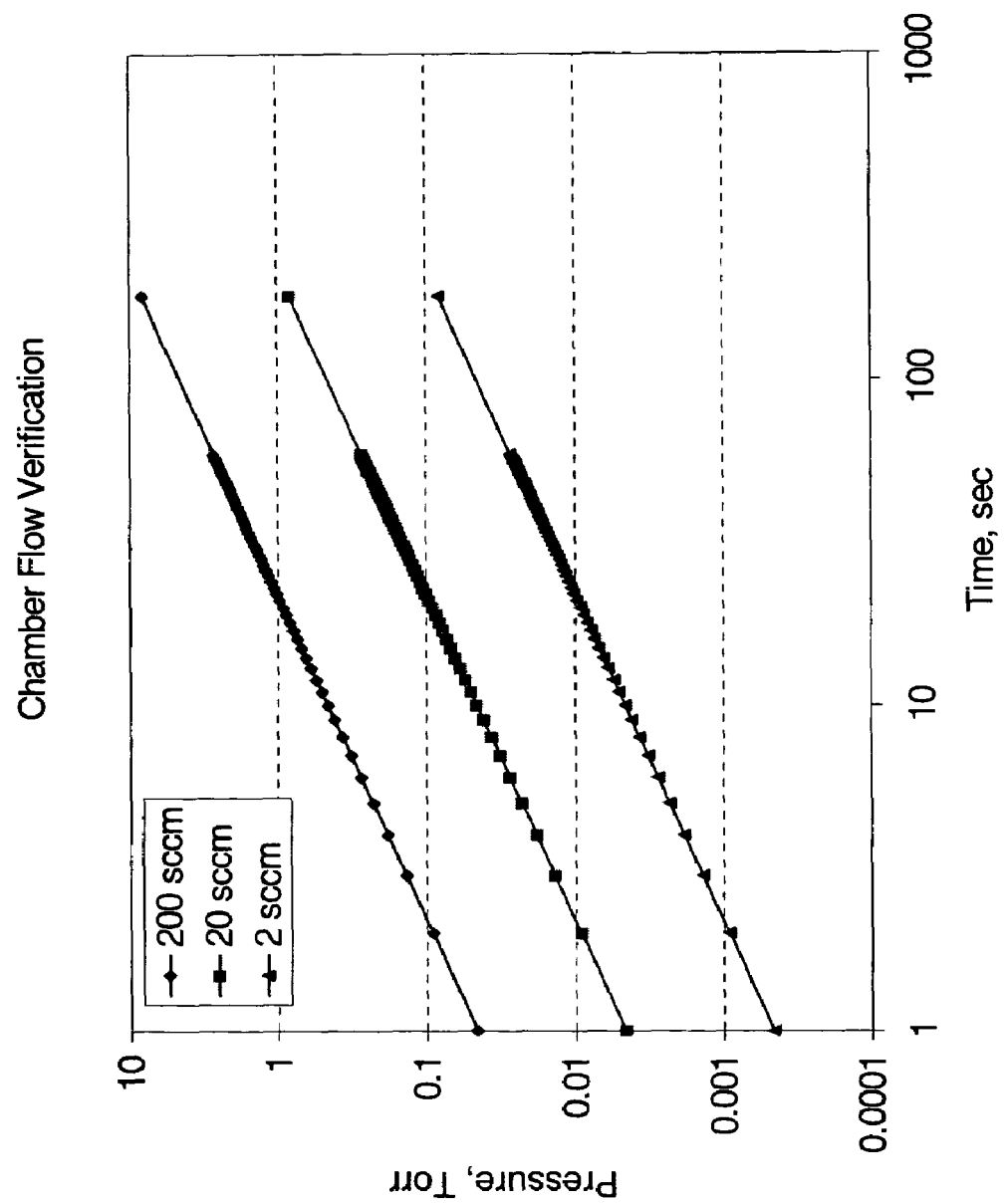
FIG. 2 includes a graph of the time required to achieve a change in pressure for some typical flow rates when utilizing a process chamber in the flow verification process.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. After reading the specification, various substitutions, modifications, additions and rearrangements which do not depart from the scope of the appended claims will become apparent to those skilled in the art from this disclosure.

Attention is now directed to systems and methods for flow verification and validating flow controllers which are capable of measuring the dynamic performance of a flow controller. These systems and methods allow for the capturing of the transient flow behavior of a flow controller in addition to its steady state behavior and may be operable to calculate flow with an update rate of at least 50 ms. As such the measurement system and method is capable of measuring mass flow controller overshoot, stabilization time, response time, repeatability of the mentioned variables and to make a quantitative measurement of volume under dynamic flow conditions and can be used for primary volume calibration.

Two volumes may be used in conjunction to accurately determine a total volume during the measurement sequence, minimize false flow conditions and reduce sensitivity to pressure transients. The flow controller may be coupled to a measurement system. The flow controller may be commanded to a specified flow and the system may begin flow measurement. Gas may be accumulated in a volume between the flow controller and the measurement system and the pressure measured within this volume. Gas may then flow into a known volume and the pressure measured. The various measurements taken during the two intervals may then be used to calculate the volume between the flow controller and the measurement system and the flow rate, the flow rate in turn may be used to determine the accuracy of a flow controller relative to a setpoint. Similarly, these systems and methods may also allow the testing of the leak through of valves within a flow controller. By signaling a flow rate of zero to a flow controller, detected changes in pressure may be attributed to leak through of those valves.

These systems and methods may employ a rate-of-rise technique to measure the performance of a flow controller, for example, the primary flow measurement technique described in ISO 5725-1 Accuracy of Measurement Methods and Results, Part 1 General Principles and Definitions. The gas equation of state may be combined with conservation of mass principles to derive a similar equation to Eq. 1, where mass flow may be determined by:

$$\dot{m} = \frac{\left[\frac{\Delta P \cdot V}{ZRT}\right]}{\Delta t} \quad \text{Eq. (2)}$$

where $\Delta P$ is the change in pressure over the interval $\Delta t$, R is the universal gas constant, T is the absolute temperature of the gas, Z is the gas compressibility factor, and V is the volume of the measurement chamber. The gas compressibility factor Z is typically equal to unity for light gases and can be significantly less than unity for heavier molecules such as $WF_6$. Use of the compressibility factor may improve the accuracy of flow measurements with non-ideal, compressible gases.

Figure 3:
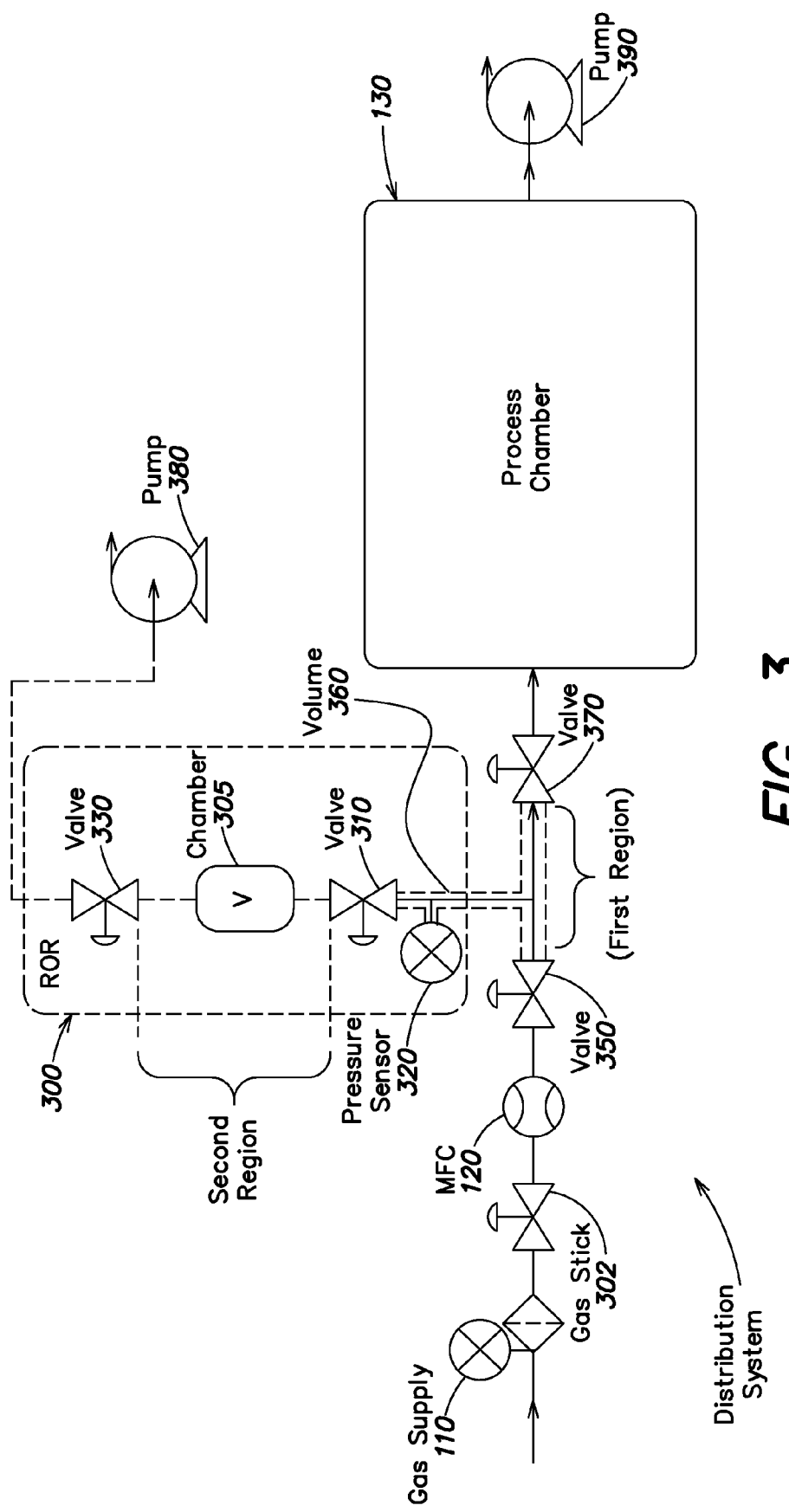
FIG. 3 includes a block diagram of one embodiment of a system for the validation of a mass flow controller.

Turning now to FIG. 3, an exemplary embodiment of a hardware arrangement which may be incorporated into the flow of gas in parallel to a process chamber to implement the systems and methods of the present invention is depicted. Rate of rise system (ROR) 300 may be utilized to measure the accuracy of flow controller 120 with respect to a setpoint. Rate of rise system 300 may be incorporated in the flow of gas through gas stick 302 to process chamber 130. In one particular embodiment, valves 350, 370 are downstream of a mass flow controller 120 and upstream of process chamber 130. ROR 300 may contain chamber 305 between valves 330, 310 and pressure sensor 320 upstream of valve 310. Pressure sensor may be of the type commonly known in the art, capable of measuring pressures from 0.1 Torr to 1000 Torr. Chamber 305 typically has a volume of anywhere from 10 cc up to a liter, compared with a typical volume of between 10 and 60 liters for process chamber 130.

ROR 300 may be coupled into the flow of gas downstream of mass flow controller 120 and valve 350, and upstream of valve 370 and process chamber 130. The physical volume of the coupling between valves 350, 370 and 310 is represented by volume 360. In many cases, ROR 300 is coupled to the gas stick using 316L stainless steel tubing with a 0.25 to 0.5 inch diameter, though other material such as nickel, chromium or steel alloys may used in the case where gas stick 302 is being utilized to transport a specialized gas. Gas flows from gas supply 110 to mass flow controller 120, which regulates the volume of gas which passes through in response to a setpoint, usually between 0.1 sccm and 100 liters a minute. If valves 310, 350 are open and valve 370 is closed, gas flows from mass flow controller 120 into chamber 305, however, if valves 350, 370 are open and valve 310 is closed gas flows from mass flow controller 120 into process chamber 130.

In certain embodiments, to enable flow measurement with ROR 300, valve 370 is closed to process chamber 130, valve 350 is opened to mass flow controller 120, and valve 310 within ROR 300 is closed. Mass flow controller 120 is commanded to a specified flow and ROR system 300 begins the flow measurement. The gas is accumulated in volume 360 between valves 350, 370, and valve 310 within ROR system 300. (This region between valves 350, 370, and 310 corresponds to a "first region".) Pressure sensor 320 within ROR 300 is upstream of valve 310 and this geometry enables the measurement of pressure within volume 360. The pressure change as a function of time may be measured to be used later for quantification of the flow measurement. At some time $\Delta t_1$ valve 330 is closed and valve 310 is opened allowing gas to flow into chamber 305 of ROR 300, a known volume. (The region into which gas flows when valve 310 is opened corresponds to a "second region".) The pressure continues to be monitored as a function of time with pressure sensor 320 in ROR 300.

Figure 4:
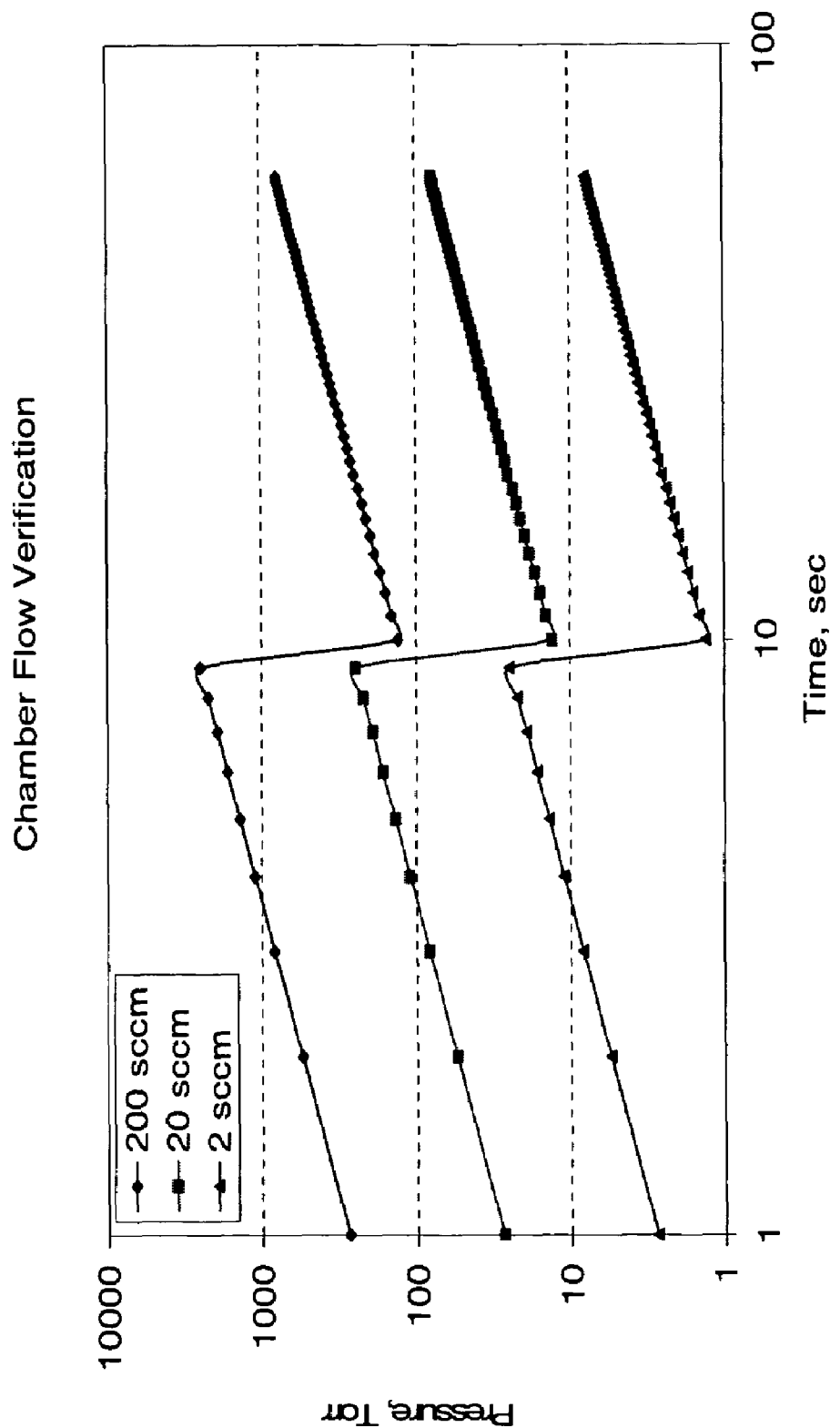
FIG. 4 includes a graph of pressure as a function of time utilizing one embodiment of the methods depicted.

A typical plot of the pressure change as a function of time is given in FIG. 4. In this figure, the initial pressure change depicted is that occurring in a sample volume 360 and the pressure change and time interval are $\Delta P_1$ and $\Delta t_1$ respectively. The second slope starting at approximately 10 seconds is when valve 2 is open and valve 3 is closed. In this case, the accumulating volume is the combination of volume 360, and the known volume of chamber 305. The pressure change with time is $\Delta P_2$ over the time interval $\Delta t_2$. Volume 360 may then be calculated using the expression below.

$$v = \frac{\left[\frac{\Delta P_2 \cdot V}{\Delta t_2}\right]}{\left[\frac{\Delta P_1}{\Delta t_1} - \frac{\Delta P_2}{\Delta t_2}\right]} \quad \text{eq. 3}$$

Eq. 3 may then be used in conjunction with Eq. 2 to determine the flow. The determined flow may then be compared against the setpoint of mass flow controller to determine the accuracy of mass flow controller 120. It will be noted that these systems and methods are able to quantify the integral amount of flow over a given time interval (in one embodiment by integrating the equations) or by using the given equation(s) over an entire interval.

Figure 5:
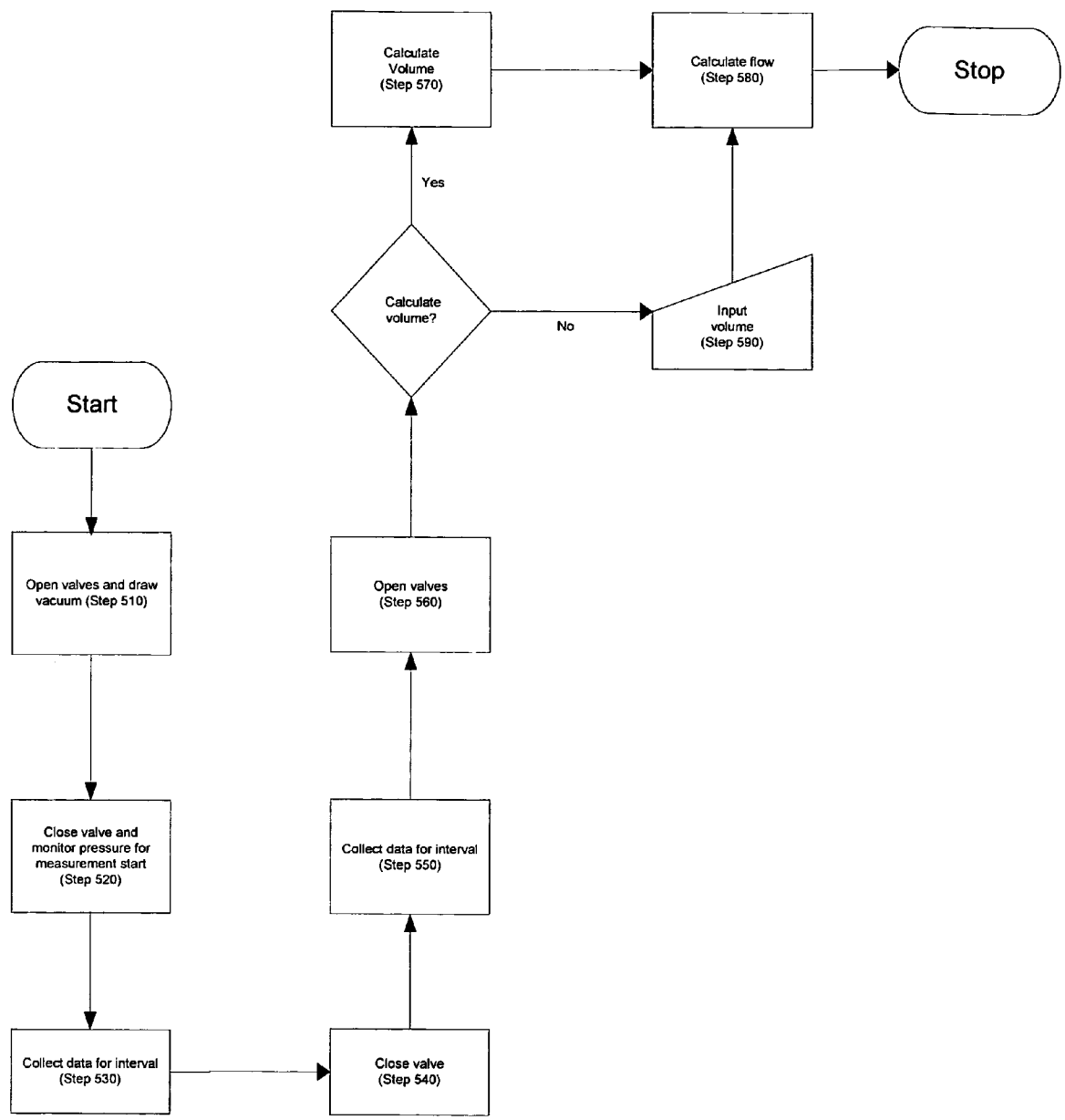
FIGS. 5-8 include flowcharts depicting various embodiments of methods to perform flow verification or validate the operation of a mass flow controller.

Turning now to FIG. 5, a flowchart for one embodiment of a method for measuring flow attributes and validating the accuracy of a mass flow controller is depicted. This particular method may be advantageous when measuring large flows (greater than 200 sccm), as a larger volume is utilized during the initial transient measurement of the flow, reducing measurement uncertainties.

In one particular embodiment, valve 370 may be closed by a control system indicating that a testing or validation of mass flow controller is to be conducted. To begin the test valves 310, 330 are opened and a vacuum is drawn (step 510) by pump 380. Valve 330 is then closed and data may be taken for the initial state (Step 520). With mass flow controller 120 flowing based on a certain setpoint, data may then be collected for a first interval (Step 530). In certain embodiments, mass flow controller 120 does not have to be at steady state for initiation of measurement.

Time, pressure and temperature may be monitored for a certain period using sensors known in the art, such as pressure sensor 320. In some embodiments, the length of this period may be determined by a pressure or time checkpoint. For example, when the pressure within volume reaches a certain Torr, the first interval may be concluded. The pressure at which the first interval concludes may vary greatly depending on the flow being measured, but is usually between 10 Torr and 1000 Torr. The first interval may also be concluded after a predetermined amount of time, usually at least 10 seconds, but not more than 60, seconds. In certain other embodiments, active temperature control of the various components may be employed during an interval to improve accuracy or to allow for measurement of low volatility gases.

After the conclusion of the first interval (Step 530), valve 310 may then be closed (Step 540) and data collected for a second interval (Step 550). As during the first interval, this data may include pressure, temperature and time, and the length of the second interval may be determined using the same criteria as discussed with respect to the first interval above.

After the conclusion of the second interval (Step 550) volume 360 and flow attributes may then be calculated (Steps 570, 580) using Eq. 2 and Eq. 3. Alternatively, volume 360 may be input (Step 590) and then flow attributes may be calculated (Step 580) using the entered volume. The flow may then be compared to the original setpoint of mass flow controller 120 to determine the accuracy of mass flow controller 120. Additionally, certain embodiments may communicate the resultant flow back to mass flow controller 120 which can then write the information into memory and recalibrate itself.

It will be understood by those of ordinary skill in the art that the various steps, measurements, and calculations may be controlled and performed in a wide variety of ways, including by a control system embedded within ROR system 300, or by the control system utilized in conjunction with mass flow controller 120, gas stick 302 and process chamber 130.

Figure 6:
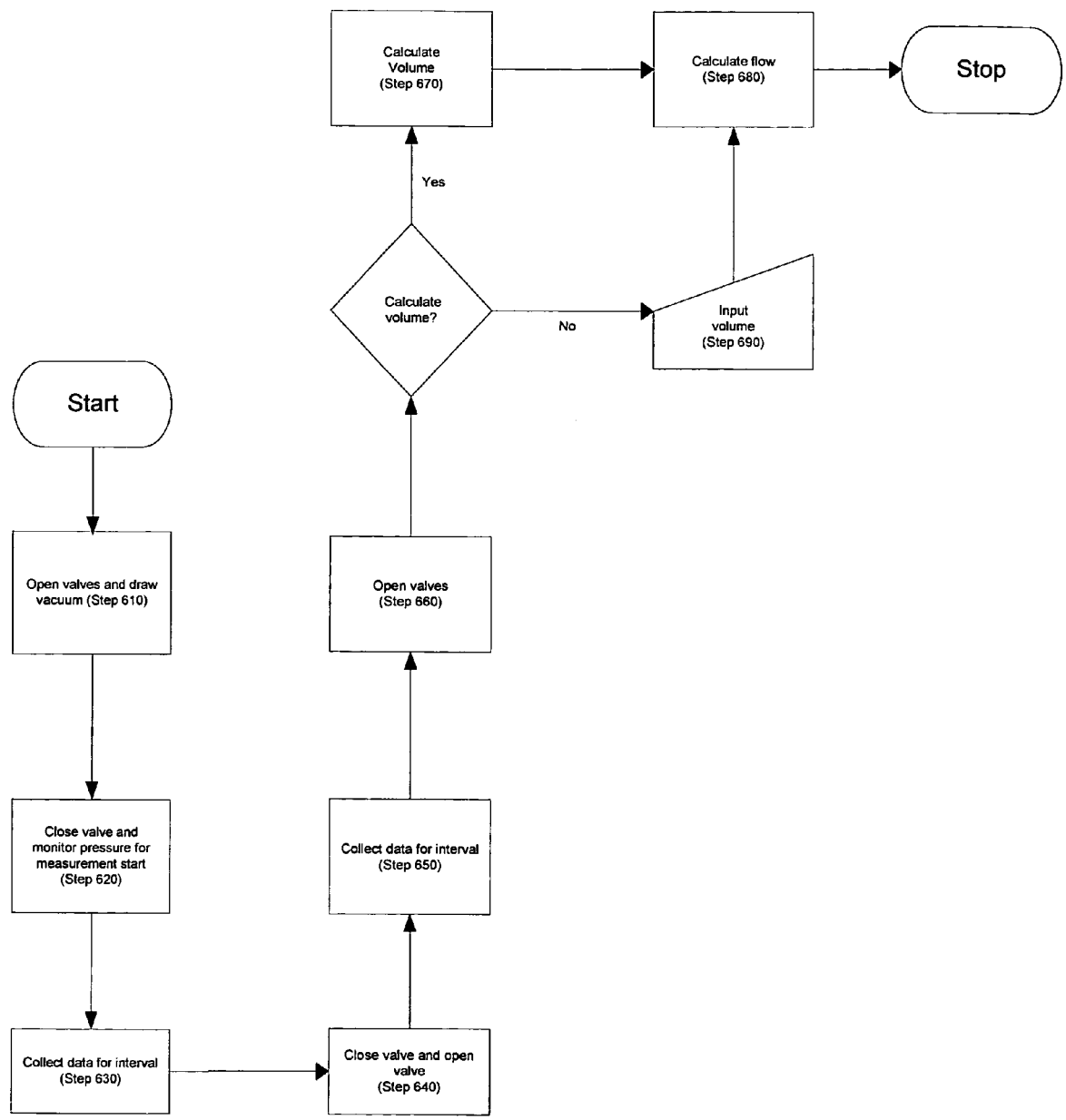

Similarly, FIG. 6 is a flowchart of a method for measuring flow and validating mass flow controller 120 which may be advantageous for moderate flows (20 sccm-200 sccm) where using the larger volume of chamber 305 during the initial transient phase is not necessarily useful.

In one embodiment valve 370 may be closed by a control system indicating that a flow measurement or validation of mass flow controller 120 is to be conducted. To conduct a test of mass flow controller, valves 310, 330 are opened and a vacuum is drawn (Step 610) by pump 380. Valve 310 is then closed and data may be taken for the initial state (Step 620). With mass flow controller 120 flowing based on a certain setpoint, data may then be collected for a first interval (Step 630). Time, pressure and temperature may be monitored for a certain period using sensors known in the art, such as pressure sensor 320. The length of this period may be determined by a pressure or time checkpoint, as discussed above with respect to FIG. 5.

After the conclusion of the first interval (Step 630), valve 330 may then be closed valve 310 opened (Step 640) and data collected for a second interval (Step 550). As during the first interval, this data may include pressure, temperature and time, and the length of the second interval may be determined using the same criteria as discussed with respect to the first interval above.

After the conclusion of the second interval (Step 650) volume 360 and flow attributes may then be calculated (Steps 670, 680) using Eq. 2 and Eq. 3. Alternatively, volume 360 may be input (Step 690) and then flow attributes may be calculated (Step 680) using the entered volume. The flow may then be compared to the original setpoint of mass flow controller 120 to determine the accuracy of mass flow controller 120.

Once volume 360 between valves 350, 370 and 310 is determined, flow measurement may be conducted using only volume 360. In many installations volume 360 is small (less than 20 cc), consequently the pressure change for a specified flow rate easier to measure, typically reducing the measurement time for a given flow rate by a factor of five.

Figure 7:
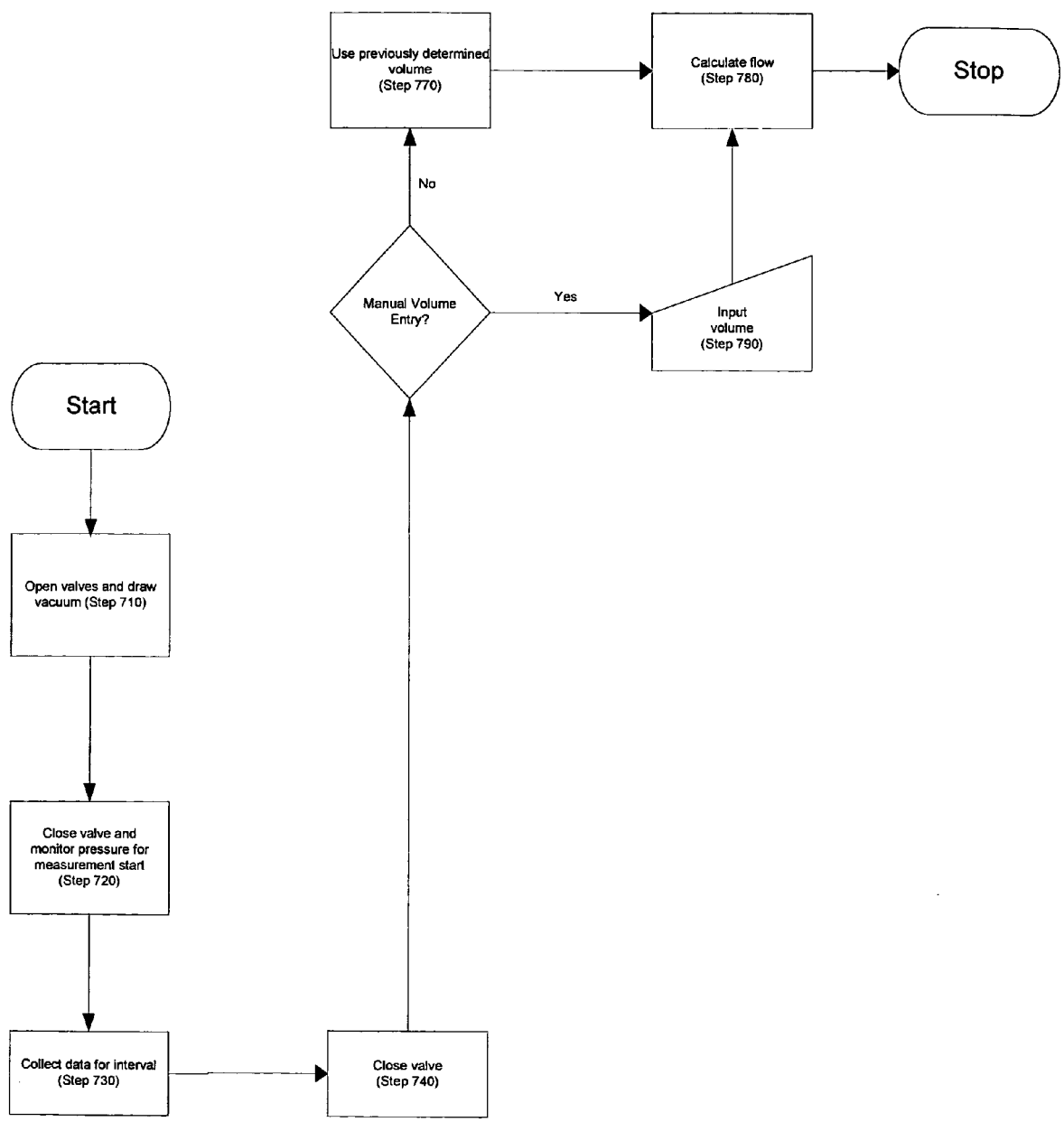

FIG. 7 illustrates one method for utilizing volume 360 for measuring flow attributes or verification of mass flow controller 120. This method may be particularly effective for flow rates less than 20 sccm, and allow the use of a much shorter measurement interval. Valve 370 may be closed by a control system indicating that a flow measurement or validation of mass flow controller 120 is to be conducted. To conduct a test of mass flow controller, valves 310, 330 are opened and a vacuum is drawn (Step 710) by pump 380. Valve 310 is then closed and data taken for the initial state (Step 720). With mass flow controller 120 flowing based on a certain setpoint, data may then be collected over a first interval (Step 730), as discussed above.

After the conclusion of the first interval (Step 730), valve 310 may be opened and valve 330 closed (Step 740). In certain cases it may be advantageous to open valve 330 before valve 310 so pressure is maintained in volume 360 throughout the entire first interval. After the conclusion of the first interval (Step 730) flow attributes may then be calculated (Step 780) using Eq. 2 and Eq. 3 and the previously determined measurement of volume 360 (Step 770). Alternatively, volume 360 may be input manually by a user (Step 790) and then flow attributes may be calculated (Step 780). The calculated flow may then be compared to the setpoint of mass flow controller 120 to determine the accuracy of mass flow controller 120.

Additionally, once volume 360 between mass flow controller valve and valve is determined, flow measurement may be conducted using the known volumes of chamber 305 and volume 360. This may be useful for high flow volumes where a large measurement volume is desirable.

Figure 8:
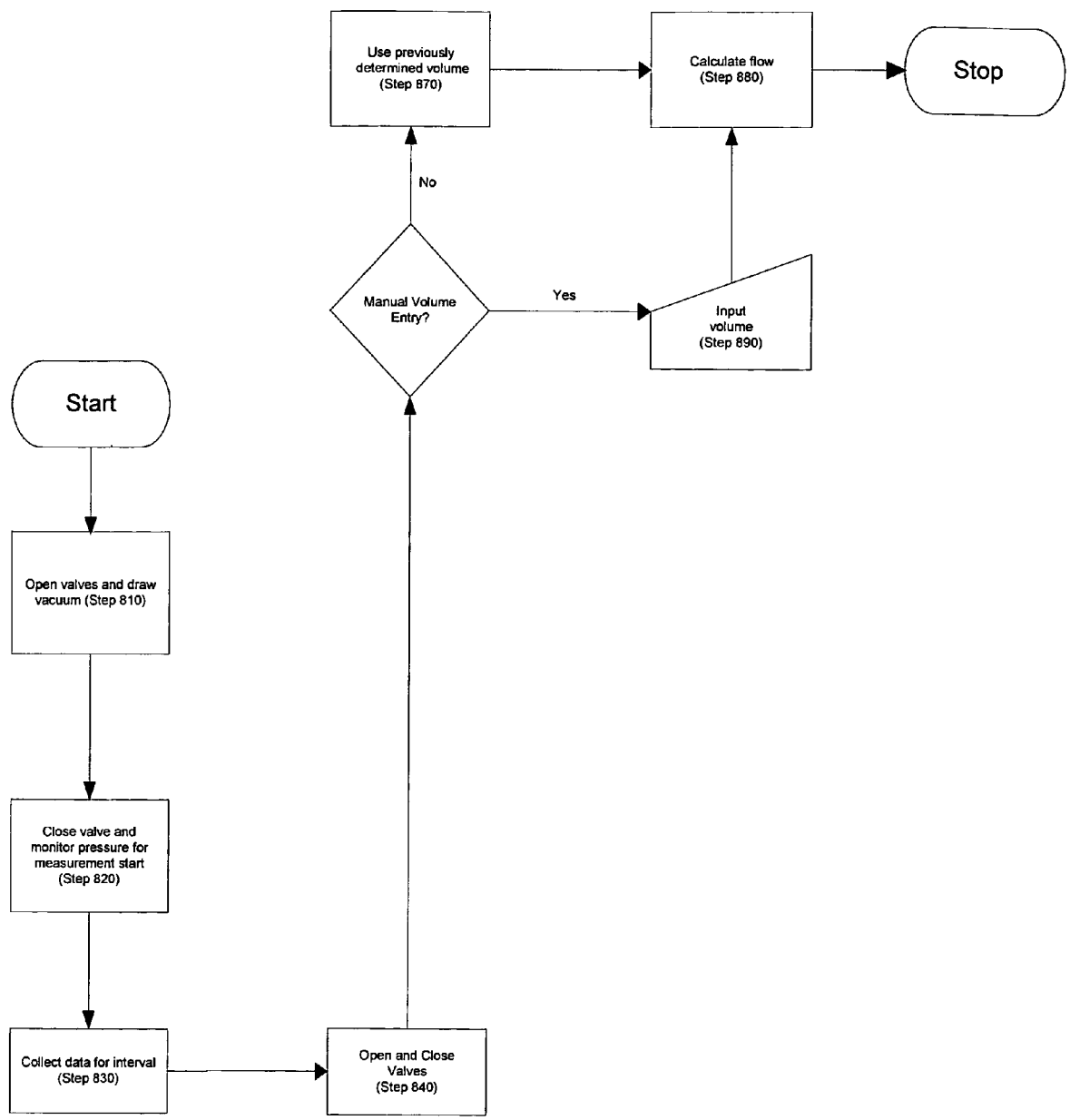

FIG. 8 illustrates one method for utilizing volume 360 and chamber 305 in combination for flow measurement or verification of mass flow controller 120. Valve 370 may be closed by a control system indicating that a flow measurement or validation of mass flow controller 120 is to be conducted. To conduct a test of mass flow controller, valves 310, 330 are opened and a vacuum is drawn (Step 810) by pump 380. Valve 330 is then closed and data taken for the initial state (Step 820). With mass flow controller 120 flowing based on a certain setpoint, data may then be collected over a first interval (Step 830), as discussed above.

After the conclusion of the first interval (Step 830), valve 330 may then be opened (Step 840), and flow attributes may then be calculated (Step 880) using Eq. 2 and Eq. 3, the previously determined measurement of volume 360 (Step 870), and the known volume of chamber 305. Alternatively, volume 360 may be input manually by a user (Step 890) and then flow attributes calculated (Step 880). The flow is then compared to the setpoint of mass flow controller 120 to determine the accuracy of mass flow controller 120.

Note that not all of the steps described with respect to FIGS. 5-8 are necessary, that a step may not be required, and that further steps may be utilized in addition to the ones depicted, including additional measurements, intervals etc. Additionally, the order in which each element of the methods is described is not necessarily the order in which it is utilized. After reading this specification, a person of ordinary skill in the art will be capable of determining which arrangement of steps will be best suited to a particular implementation.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method of measuring a rate of flow through a flow controller that is operatively connected to a distribution system having a first region and a second region, the first region having a first internal volume and the second region having a second internal volume, wherein fluid communication between the first region and the second region may be operatively allowed and disallowed via a valve, the method comprising acts of:
    collecting first data pertaining to the first region during a first interval;
    collecting second data pertaining to the first region and the second region during a second interval;
    determining the first internal volume based upon the first data, the second data, and the second internal volume; and
    calculating the rate of flow based upon the first internal volume and the first data.

2. The method of claim 1, wherein the act of determining the first internal volume comprises calculating the first internal volume based upon an equation of state.

3. The method of claim 1, wherein the first data includes a change in pressure over the first interval and the second data includes a change in pressure over the second interval.

4. The method of claim 3, wherein the act of collecting second data is performed before the act of collecting first data.

5. The method of claim 3, wherein the act of collecting first data is performed before the act of collecting second data.

6. The method of claim 3, wherein at least one of the duration of the first interval and the duration of the second interval is a predetermined length of time.

7. The method of claim 3, wherein at least one of the duration of the first interval and the duration of the second interval is determined based upon at least one of the first data and the second data meeting a condition.

8. The method of claim 1, wherein determining the first internal volume comprises receiving an input corresponding to the second internal volume.

9. The method of claim 8, wherein the first data includes a change in pressure over the first interval and the second data includes a change in pressure over the second interval.

10. The method of claim 9, wherein the act of collecting second data is performed before the act of collecting first data.

11. The method of claim 9, wherein the act of collecting first data is performed before the act of collecting second data.

12. The method of claim 1, wherein at least one of the duration of the first interval and the duration of the second interval is determined based upon at least one of the first data and the second data meeting a condition.

13. The method of claim 1, further comprising an act of determining the second internal volume prior to the acts of collecting at least one of the first data and the second data.

14. The method of claim 13, wherein the second internal volume is determined empirically.

15. The method of claim 13, wherein the second internal volume is determined by receiving an input corresponding to the second internal volume.

16. A method of measuring a rate of flow through a flow controller that is operatively connected to a distribution system having a first region and a second region, the first region having a first internal volume and the second region having a second internal volume, wherein fluid communication between the first region and the second region may be operatively allowed and disallowed via a valve, the method comprising acts of:
    collecting first data pertaining to the first region during a first interval;
    collecting second data pertaining to the first region and the second region during a second interval; and
    calculating the rate of flow based on the first data, the second data, and the first internal volume, wherein the first internal volume was previously determined or is received as input.

17. The method of claim 16 wherein the first internal volume was previously determined by:
    collecting previous first data pertaining to the first internal volume during a previous first interval;
    collecting previous second data pertaining to the second internal volume during a previous second interval; and
    calculating the first internal volume based on the previous first data and previous second data.

18. A measurement system for measuring a rate of flow through a flow controller that can be operatively coupled to a fluid distribution system downstream of the flow controller, the measurement system comprising:
    an inlet;
    a pressure sensor operatively coupled to the inlet;
    a valve operatively coupled to the inlet downstream of the pressure sensor; and
    a chamber having a known internal volume and operatively coupled to the valve downstream of the valve;
    wherein, when the inlet of the measurement system is operatively coupled to the fluid distribution system, the measurement system is:
    collects a first data pertaining to a first volume during a first interval, the first volume corresponding to an internal volume of the fluid distribution system and an internal volume of the measurement system that is disposed downstream of the flow controller and upstream of the valve;
    collects a second data pertaining to a second volume during a second interval, the second volume corresponding to the internal volume of the fluid distribution system and an internal volume of the measurement system that is disposed downstream of the flow controller; and
    determines the rate of flow through the flow controller based upon the first data, the second data, and the known internal volume of the chamber.

19. The measurement system of claim 18, wherein the first data includes a change in pressure over the first interval and the second data includes a change in pressure over the second interval.

20. The measurement system of claim 18, wherein the measurement system is operable to collect the second data before collecting the first data.

21. The measurement system of claim 18, wherein the measurement system is operable to collect the first data before collecting the second data.

22. The measurement system of claim 18, wherein at least one of the duration of the first interval and the duration of the second interval is determined based upon at least one of the first data and the second data meeting a condition.

23. The measurement system of claim 18, further comprising:

an outlet operatively coupled to a second valve, the second valve being disposed downstream of the chamber.

* * * * *